(12) United States Patent
May et al.

(10) Patent No.: US 6,932,002 B2
(45) Date of Patent: Aug. 23, 2005

(54) SYSTEM AND METHOD OF PROCESSING SOLID WASTE

(75) Inventors: David F. May, Prestonburg, KY (US); David F. May, Jr., Allen, KY (US); John W. Burke, Jr., Prestonburg, KY (US)

(73) Assignee: Recycling Solutions Technology, LLC, Prestonsburg, KY (US)

( * ) Notice: Subject to any disclaimer, the term of this patent is extended or adjusted under 35 U.S.C. 154(b) by 0 days.

(21) Appl. No.: 10/654,673

(22) Filed: Sep. 4, 2003

(65) Prior Publication Data

US 2005/0051066 A1 Mar. 10, 2005

(51) Int. Cl.[7] .............................................. F23J 15/00
(52) U.S. Cl. ...................... 110/345; 110/246; 110/215
(58) Field of Search ................................ 110/342, 344, 110/345, 346, 210, 215, 226, 246

(56) References Cited

U.S. PATENT DOCUMENTS

| | | | |
|---|---|---|---|
| 3,680,500 A | 8/1972 | Pryor | |
| 3,734,037 A | 5/1973 | Martin | |
| 4,320,709 A | * 3/1982 | Hladun | 110/235 |
| 4,351,809 A | * 9/1982 | Megy et al. | 423/157.2 |
| 4,438,705 A | 3/1984 | Basic, Sr. | |
| 4,520,738 A | 6/1985 | Takehara | |
| 4,941,415 A | 7/1990 | Pope et al. | |
| 4,976,206 A | 12/1990 | Steiner et al. | |
| 5,018,457 A | * 5/1991 | Brady et al. | 110/346 |
| 5,134,944 A | 8/1992 | Keller et al. | |
| 5,207,176 A | * 5/1993 | Morhard et al. | 110/246 |
| RE34,298 E | * 6/1993 | Gitman et al. | 431/5 |
| 5,230,211 A | 7/1993 | McMahon et al. | |
| 5,245,114 A | 9/1993 | Forrester | |
| 5,288,195 A | 2/1994 | McIntyre | |
| 5,315,938 A | 5/1994 | Freller | |
| 5,331,746 A | 7/1994 | Martin et al. | |
| 5,401,481 A | * 3/1995 | Rochelle et al. | 423/331 |
| 5,711,233 A | 1/1998 | Martin et al. | |
| 5,823,122 A | 10/1998 | Chronowski et al. | |
| 5,988,080 A | 11/1999 | Miyoshi et al. | |
| 6,032,467 A | 3/2000 | Oshita et al. | |
| 6,116,169 A | 9/2000 | Miyoshi et al. | |
| 6,149,765 A | 11/2000 | Mansour et al. | |
| 6,168,425 B1 | 1/2001 | Fujinami et al. | |
| 6,405,663 B1 | * 6/2002 | Jones | 110/342 |
| 2002/0156545 A1 | 10/2002 | Sekino et al. | |
| 2003/0013059 A1 | 1/2003 | Dutescu et al. | |

OTHER PUBLICATIONS

CBS News Website, Aug. 20, 2003.

* cited by examiner

*Primary Examiner*—Kenneth Rinehart
(74) *Attorney, Agent, or Firm*—Wood, Herron & Evans, LLP

(57) ABSTRACT

A system and associated method of processing solid waste via a waste gasification process results in usable by-products. The method utilizes a rotary kiln heated to a temperature of at least 800° F. and a reduction chamber, heated to a temperature of at least 1800° F. The solid waste is slowly rotated in the kiln for six to eight hours. The solid material is passed through screens to separate the ash from other items. Gases are monitored and transported to the reduction chamber to generate power. The gases are then transported to at least one air pollution control unit to remove contaminants before being vented into the atmosphere.

28 Claims, 3 Drawing Sheets

SYSTEM AND METHOD OF PROCESSING SOLID WASTE

FIELD OF THE INVENTION

This invention relates to the disposal of solid waste and, more particularly, to a system and associated method of processing such waste into usable by-products in an environmentally friendly manner.

BACKGROUND OF THE INVENTION

Municipal solid waste is commonly incinerated in a combustion process at high temperatures such as 1600 degrees Fahrenheit. This incineration process seeks to destroy the waste by burning it, usually at high temperatures with excess air. The ultimate purpose of the process is to burn as much waste as possible as quickly as possible. One potential problem with such incineration is the emissions of the incinerator may contain toxic and other unwanted pollutants dangerous to human health and the environment. Another potential problem with conventional incineration is that the process destructs all the municipal solid waste and does not recycle any of it. Another problem with incinerating municipal solid waste is that the resultant ash must be sent to a particular type of landfill subject to restrictive environmental regulations.

Therefore, there is a need in the industry for a process of treating municipal solid waste in an environmentally friendly manner which uses all of the residual by-products of the process.

There is also a need for a process of treating municipal solid waste in an environmentally friendly manner which is capable of generating electricity.

SUMMARY OF THE INVENTION

The method of the present invention in one embodiment comprises a method of processing solid waste in an environmentally friendly manner using waste gasification. The waste gasification process of the present invention gasifies and reduces solid waste, most often municipal solid waste. Waste gasification converts the incoming solid waste or feedstock into combustible gases such as carbon monoxide, methane and hydrogen which contain the energy originally present in the feedstock. This waste gasification process degrades the feedstock in a rotary kiln in the absence of adequate air to support full combustion. The gases generated in the rotary kiln are not burned in the kiln, but rather transported to a reduction chamber where they may be burned to generate steam for purposes of generating electricity. The temperature inside the rotary kiln is at least 800 degrees Fahrenheit and preferably between 800–1000 degrees Fahrenheit to carry out this waste gasification process.

The waste gasification process converts the feedstock waste materials such as municipal solid waste, tires, coal gob, wood construction debris and/or lawn waste into a BTU-rich gaseous fuel. This fuel may be used "on site" as a non-fossil fuel source for various industrial processes, such as the production of hot water or steam-powering internal combustion engines as examples. This process combusts the waste in a "starved air" combuster, which degrades the municipal solid waste with less oxygen, thereby improving the quality of the resultant air emissions. This process, like the incineration process, vents the flue gases to the atmosphere after they have been sufficiently cleaned.

Nothing generated by the waste gasification process of the present invention needs to be placed in a landfill. One hundred percent of the incoming waste stream is either recovered as an alternative energy source, recycled or otherwise utilized. All of the ferrous and non-ferrous metals, aluminum and glass are recovered at the end of the process. The only other product remaining is a fine, mineral residual (primarily glass containing less than five percent carbon) that is an acceptable concrete additive.

The method comprises transporting the waste to a receiving hopper where it is temporarily stored. A rotary kiln is located downstream of the receiving hopper. The municipal solid waste or other feedstock is fed into the rotary kiln via a hydraulic ram preferably. However, any other means of introducing or feeding the municipal solid waste into the rotary kiln may be used.

The rotary kiln is heated to a temperature of at least 800 degrees Fahrenheit and preferably between 800–1000 degrees Fahrenheit. A driver such as a motorized drive system rotates the rotary kiln at a rate of approximately one revolution per minute. However, the driver may rotate the rotary kiln at any desired speed.

After the kiln has been rotated for six to eight hours preferably, gases are transported to a reduction chamber. The reduction chamber functions as a destruction mechanism for the elimination or reduction of volatile organic compounds (VOCs), hydrocarbons, dioxins, furans and various other gases and compounds. The reduction chamber is heated to a temperature of at least 1800 degrees Fahrenheit before the process begins. The reduction chamber is maintained at a temperature of between 1800 and 2400 degrees Fahrenheit by at least one gas burner. However, any other means of heating the reduction chamber may be used as well without departing from the spirit of this invention.

To maintain the temperature of the gases exiting the rotary kiln and going to the reduction chamber at a temperature of 800–1200 degrees Fahrenheit, at least one of the following may be adjusted by a programable logic controller: the feed rate of the waste going into the rotary kiln; the rotation speed of the rotary kiln; and/or the amount of air flow into the interior of the rotary kiln. The gases are retained or held in the reduction chamber for at least one second.

Upon exiting the reduction chamber the gases are cooled by a spray of water in a duct to reduce the temperature of the gases to approximately 500 degrees Fahrenheit. The gases are then passed through at least one air pollution control unit in which contaminants such as $SO_2$, $NO_x$, hydrogen chloride, mercury, dioxins and furans, along with particulate matter are removed. In the present invention there are preferably three air pollution control units: a reduction chamber, a spray dryer absorber and a baghouse. However, there may be more or fewer air pollution control units incorporated into the system.

In the spray dryer absorber, the gases are treated to remove any remaining acids and metals that might be present. A slurry of lime and activated carbon is injected into the top of the spray dryer absorber unit for this treatment. Spent carbon and other particulate matter that may be generated at the spray dryer absorber are collected at the bottom of the spray dryer absorber and transferred via a conveyor to a fly ash bin.

From the spray dryer absorber the gases are ducted to a multi chamber baghouse for final removal of any remaining contaminates. Although the baghouse preferably has four chambers, it may contain any number of chambers in accordance with the present invention. In the baghouse, the gases pass through filters to remove particulate matter. Particulates including ash generated in the baghouse are collected and transported on a conveyor belt to the fly ash bin.

From the baghouse the gases are discharged into the atmosphere and continuous emission monitors record the air quality of the emissions.

Thus, with the present invention all of the solid waste is used or recycled in an environmentally-friendly manner. These and other objects and advantages of the present invention will be evident from the following detailed description and the drawings.

DETAILED DESCRIPTION OF THE DRAWINGS

Figure 1:
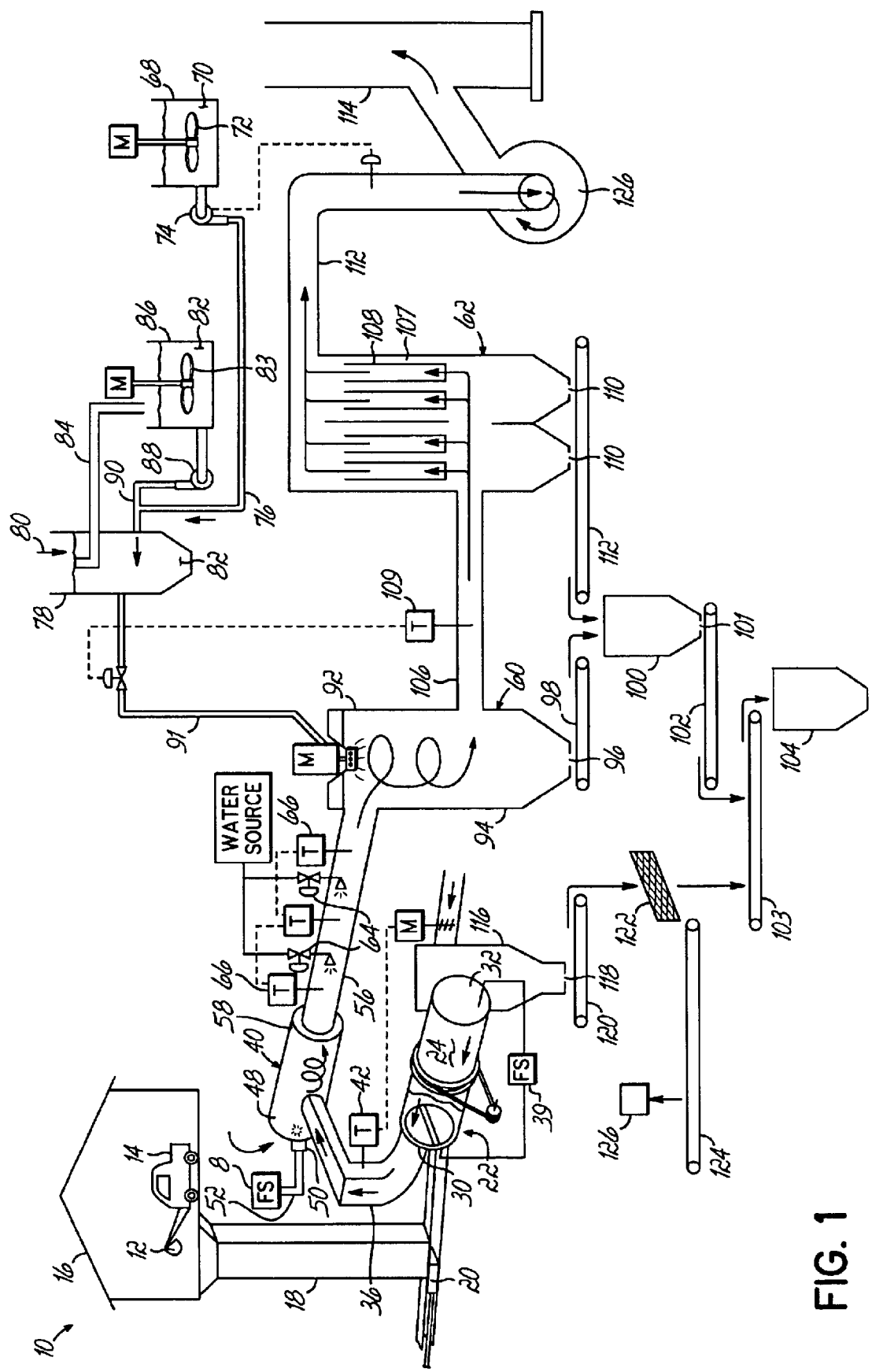
FIG. 1 is a schematic view of the equipment used to practice the method of the present invention.

Referring to the drawings, and particularly to FIG. 1, there is illustrated one embodiment of a solid waste gasification facility or system 10 designed to process solid waste into usable by-products. Although the present invention preferably processes municipal solid waste, it may be used to process any solid waste. Municipal solid waste 12 is transported via trucks 14 into a building 16. The building 16 protects the municipal solid waste from the elements and may be any desired size, configuration or construction. Although trucks are illustrated, any other means of transporting municipal solid waste to the building 16 may be used, such as rail, for example. Once inside the building 16, the municipal solid waste 12 is moved into an enclosed receiving hopper 18. Although one configuration and location of receiving hopper 18 is illustrated, the receiving hopper may assume numerous other configurations and may be located at other locations such as outside the building 16.

Preferably, the building 16 is large enough (100 feet by 70 feet) to accommodate approximately 800 tons of municipal solid waste so that if a need arises to store a large quantity of waste, the facility will be able to handle it. Inside the building 16, the municipal solid waste 12 is preferably transferred from the trucks 14 via one or more conveyors (not shown) to the receiving hopper 18. The building 16 preferably has a reinforced concrete floor. Although the conveyor and receiving hopper 18 are preferably enclosed to keep the municipal solid waste 12 from getting wet from precipitation, they need not necessarily be so covered.

Figure 2:
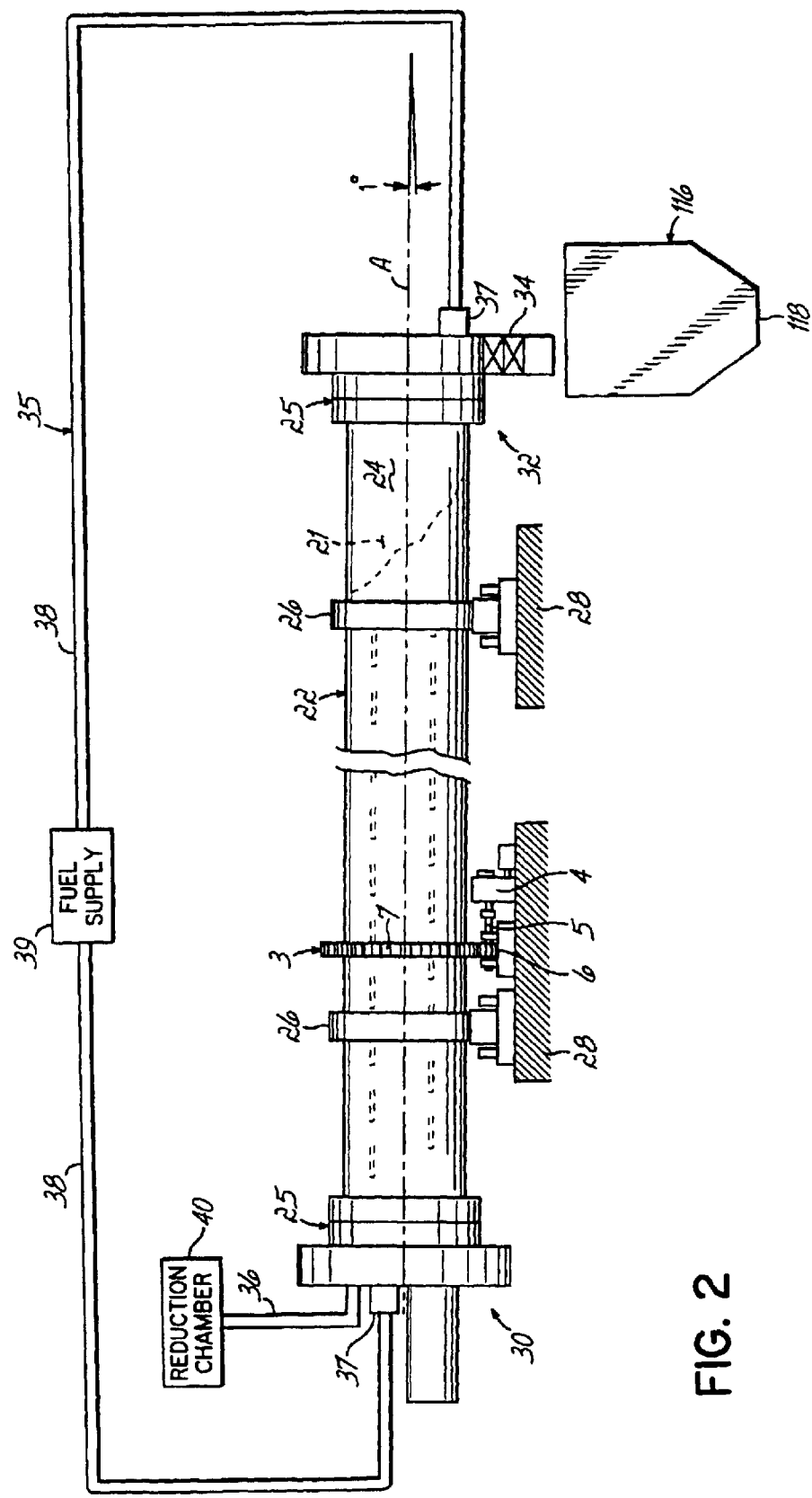
FIG. 2 is an side elevated view of the rotary kiln of the present invention.

The receiving hopper 18 is positioned directly above a feeder 20 in the form of a hydraulic ram which pushes the municipal solid waste into a rotary kiln 22, shown in greater detail in FIG. 2. The hydraulic ram 20 is preferably able to push up to 42 tons of municipal solid waste into the rotary kiln 22 in a 24-hour period. However, any size ram may be used. The hydraulic ram 20 may assume the form of augers or any other suitable structure. Any other means of pushing the municipal solid waste 12 into the rotary kiln 22 may be used in accordance with the present invention.

As best shown in FIG. 2, the rotary kiln 22 has an outer shell 24 which is generally cylindrical in shape. It is preferably 120 feet in length. It preferably has an inner diameter of nine feet inside its shell 24 and an outer diameter of 10 feet. It rotates about a rotary axis A which is positioned with a 1° slope relative to horizontal. The rotary kiln 22 is preferably refractory lined and sealed at both ends with seal systems 25. The outer shell 24 and seal systems 25 define the interior 21 of the rotary kiln. However, any size or configuration of rotary kiln may be used in accordance with the present invention.

As best shown in FIG. 2, the rotary kiln 22 is positioned on trunion frames 26 installed on reinforced concrete 28. The rotary kiln 22 has a feed end 30, an exit end 32, and an exit chute 34 at exit end 32. The rotary kiln 22 further has exit gas duct 36 located on the high or feed end 30 of the kiln 22.

Each end 30, 32 of the rotary kiln 22 has a double seal system 25 which comprises a plurality of spring steel overlapping leafs (not shown) attached to a stationary hood (not shown). The purpose of the overlapping leaf seal is to keep any air entrained particulate (dust) from escaping the rotary kiln. The second component of each double seal 25 is a high temperature fabric belt (not shown) that keeps outside air from entering the interior of the rotary kiln 22. This fabric belt is secured to the stationary hood and fits tightly against a wear band (not shown) attached to the outer shell 24 of the rotary kiln 22.

The rotary kiln 22 is driven by a drive means 3 including a motor 4 which rotates a drive shaft 5 which turns a first gear 6. The first gear 6 engages a second gear 7. Rotation of the first gear 6 causes the second gear 7, which extends around the shell 24 of the rotary kiln 24, to rotate. The second gear 7 is preferably welded to the shell 24 of the rotary kiln 22 but may be secured any other way. The rotary kiln 22 preferably rotates at a rate of one revolution per minute, but may rotate at any desired speed. Any other drive means may be used to rotate the kiln 22.

The rotary kiln 22 is heated by a heating system 35 including burners 37 located at the feed and exit ends 30, 32 of the kiln 22 and fuel lines 38 leading from one or more natural fuel supplies 39 to burners 37. Although natural gas is the fuel of choice, any other fuel other than natural gas such as propane may be used in accordance with the present invention. Although the burners 37, fuel lines 38 and fuel supply 39 are illustrated in certain locations, they may be located elsewhere without departing from the present invention. The burners 37 may be any type of burners. However, one burner known to work in accordance with the present invention is manufactured by Maxon Corporation (www.maxoncorp.com), generates 18 million BTUs and sold as a model 18 M Maxon KINEDIZER®.

Activation of the heating system 35 allows the operating temperature of the interior 21 of the rotary kiln 22 to be at least 800 degrees Fahrenheit and preferably between 800–1000 degrees Fahrenheit. Once the appropriate temperature has been reached in the interior 21 of the rotary kiln 22, the flame will be extinguished in the burners 37, and the municipal solid waste 12 inside the interior 21 of the rotary kiln 22 is able to sustain the temperature during the rest of the processing time. The high temperature inside the rotary kiln 22 vaporizes all moisture that is part of the municipal solid waste 12. After the burners 37 are turned off, the municipal solid waste 12 serves as its own fuel source inside the interior 21 of the rotary kiln 22.

As seen in FIG. 1, duct 36 extends from the upper portion of the feed end 30 of the rotary kiln 22 into a reduction chamber 40. The duct 36 is preferably circular in cross section having a diameter of five feet. However, any other size or configuration of duct may be used in accordance with the present invention. A temperature probe 42 is located in the duct 36. The temperature probe 42 is connected to a combustion control system 2, shown in FIG. 3.

Figure 3:
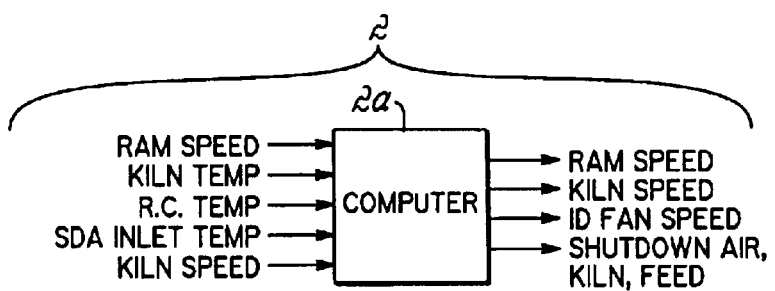
FIG. 3 is a schematic view of the combustion control system of the present invention.
Figure 4:
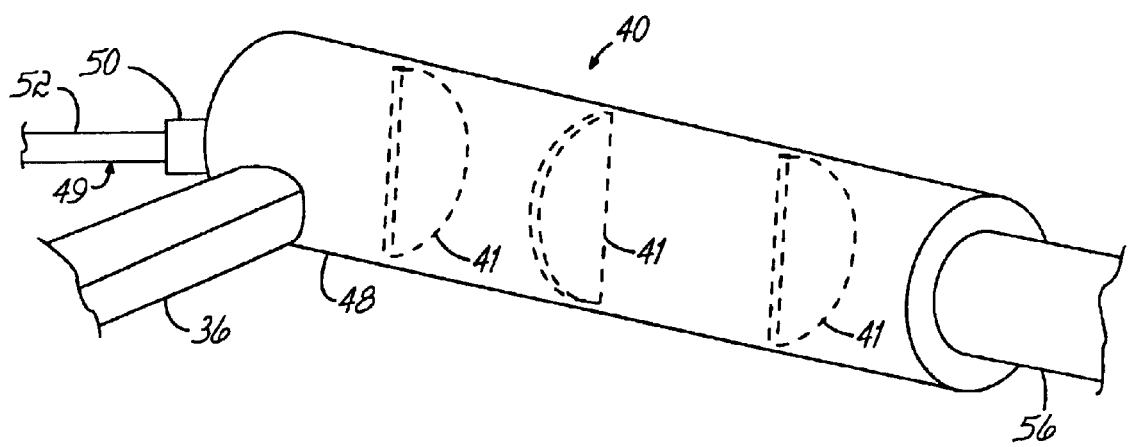
FIG. 4 is a perspective view of the reduction chamber of the present invention.

The combustion control system 2, shown in FIG. 3, includes a programable logic controller 2a. The combustion control system 2 may add or reduce airflow into the rotary kiln 22 and/or the reduction chamber 40, change the speed of rotation of the rotary kiln 22, or change the feed rate of municipal solid waste 12 into the rotary kiln 22.

The reduction chamber ("R.C.") 40 is placed on a reinforced concrete pad (not shown) and receives gases from the rotary kiln 22. The reduction chamber 40 is preferably cylindrical in configuration having a length of 45 feet and a diameter of 11 feet. Inside the reduction chamber 40 are three ceramic baffles 41, each in the shape of a semi-circle. Each baffle 41 is constructed of firebrick and covers approximately half of the interior of the reduction chamber 40. The baffles 41 are offset from one another to increase the retention time of the gases inside the reduction chamber 40. The baffles 41, once heated, retain heat and help ensure complete combustion of all volatile organic compounds (VOCs), hydrocarbons, and other pollutants. Although three baffles are illustrated and described, any number of baffles of any configuration may be incorporated into the reduction chamber. Any other configuration or size of reduction chamber may be used in accordance with the present invention.

The gases passing through the duct 36 to the reduction chamber 40 from the rotary kiln 22 and measured at temperature probe 42 are preferably at 800 degrees Fahrenheit. A heating system 49 including a start-up burner 50, a fuel supply ("FS") 8 which is preferably natural gas and a gas supply line 52 extending from the fuel supply to the start-up burner 50 is located at the first end 48 of the reduction chamber 40. The burner 50 may be any type of burner. However, one burner known to work in accordance with the present invention is manufactured by Maxon Corporation (www.maxoncorp.com), generates 9 million BTUs and sold as a model 9 M Maxon KINEDIZER®. The temperature in the reduction chamber 40 is maintained at a minimum of 1800 degrees Fahrenheit and preferably between 1800 to 2400 degrees Fahrenheit. Therefore, the gases exiting the reduction chamber are preferably at least at 1800 degrees Fahrenheit. Once the gases brought to the reduction chamber 40 via duct 36 are self-sustaining, the start-up burner 50 may be shut off with the gases able to maintain the temperature. The gases are retained in the reduction chamber 40 for at least one second.

Duct 56 extends from a second or exit end 58 of the reduction chamber 40 to air pollution control equipment which includes two units: a spray dryer absorber 60 and a baghouse 62. The duct 56 is preferably circular in cross section having a diameter of five feet. However, any other size or configuration of duct may be used in accordance with the present invention. The duct 56 has a series of misting nozzles 64 and a series of temperature probes 66 to control and monitor the temperature of the gases going from the reduction chamber 40 to the spray dryer absorber 60. The temperature of gases going into the spray dryer absorber 60 is approximately 500° F.

The spray dryer absorber ("SDA") 60 receives the gases from the reduction chamber 40. The purpose of the spray dryer absorber 60 is to treat the gases for any remaining metals and acids that may be present. An eighty ton lime silo (not shown) and a thirty ton carbon silo (not shown) are installed on site. Any other size or storage means may be used to store those items. A holding tank 68 contains a lime slurry 70 stirred by a power driven stirrer 72. The lime slurry 70 is pumped via pump 74 through a line 76 to a head tank 78. Carbon is introduced into the top of the head tank 78 in the direction of arrow 80 to create a mixed slurry 82 in the head tank 78. An overflow line 84 extends from the head tank 78 to another holding tank 86. The mixed slurry 82 is stirred by a power driven stirrer 83 and is pumped via pump 88 through a line 90 to the head tank 78. The mixed slurry 82 is passed through a line 91 and sprayed into an upper portion 92 of the spray dryer absorber 60. The mixed slurry 82 reduces the temperature of the gases and removes $SO_2$, $NO_x$ and certain metals from the gases. The spray dryer absorber 60 has a lower portion 94 having an exit 96 through which passes spent carbon and other particulate matter generated in the spray dryer absorber 60. The spent carbon and other particulate matter generated in the spray dryer absorber 60 after having passed through the exit 96 are carried via an endless conveyor 98 to a fly ash bin 100.

The fly ash bin 100 has an exit 101 through which the fly ash passes. The fly ash then is carried via endless conveyors 102, 103 to a final ash bin 104. Ash in the final ash bin may be used in concrete as filler.

The gases are ducted from the spray dryer absorber 60 via duct 106 to the baghouse 62. The baghouse 62 has four chambers 107, each chamber 107 having a filter 108. A temperature probe 109 is inserted into the duct 106 to monitor the temperature of the gases going to the baghouse 62. The temperature of the gases exiting the spray dryer absorber before going to the baghouse 62 is preferably 290 degrees Fahrenheit. If this temperature reaches 350 degrees Fahrenheit, the combustion control system 2 may shut down the operation of the facility 10. Exits 110 are located at the bottom of the baghouse 62. Ash generated in the baghouse 62 passes through these exits 110 onto an endless conveyor 112 which carries it to the fly ash bin 100.

From the baghouse 62, gases are pulled by an induced draft ("ID") fan 126 through a duct 112. After the gases pass through the fan 126 they are released to the atmosphere through an exit stack 114. Gases exiting the exit stack 114 are preferably at 260 degrees Fahrenheit but may be at any other desired temperature.

The combustion control system 2 is operational such that if any of the temperature probes detect a temperature above/below a predetermined value, the operation of the facility 10 will be terminated or shut down. For example, no waste will be introduced into the rotary kiln 22 until the temperature in the kiln 22 is at least 800 degrees Fahrenheit. If the gases entering the baghouse 62 are above 350 degrees Fahrenheit, the combustion control system will cut off or shut down the facility 10. In addition, if an operator observes deviations from the operating standards, the operator may manually shut down the operation of the facility 10.

Referring to FIG. 2, byproducts generated in the rotary kiln 22 other than gases pass through out the exit or discharge chute 34 into a holding hopper 116. The holding hopper 116 has an exit 118 through which the byproducts pass onto a conveyor 120 (see FIG. 1). At the end of the conveyor 120 is an inclined vibrating screen 122. Although only one inclined vibrating screen 122 is shown, more than one screen may be used in accordance with the present invention. The mesh of the screen 122 is such that ash may pass therethrough but larger particles such as pieces of metal, glass or aluminum may not pass through the screen (s). Below the screen 122 is conveyor 103 which takes the ash which has passed through the screen or screens to the final ashbin 104. The larger pieces of byproduct or nonash materials caught on top of the screen 122 are passed along another conveyor 124 past a magnet 126 in order to separate the metals from the non-metals. The metals are taken to a recycling facility. The non-metallic materials are pulverized and may be added to the ash for use in an on-site concrete plant.

In use, the method of processing municipal solid waste using the facility 10 described above includes heating the interior 21 of the rotary kiln 22 to a temperature of at least 800 degrees Fahrenheit and heating the reduction chamber to a temperature of at least 1,800 degrees Fahrenheit. Untreated municipal solid waste is fed into the rotary kiln 22 via the feed ram 20. The kiln 22 is rotated at approximately one revolution per minute by the drive means 3.

After the waste has been in the interior 21 of the rotary kiln 22 for a predetermined time period, preferably six to eight hours, the processed municipal solid waste, residual byproduct, or residual solids are removed from the interior 21 of the rotary kiln 22 via discharge or exit chute 34. These residual byproducts are transported to a holding hopper 116 for a time before being transported via a conveyor 120 to the inclined vibrating screen 122. The residual byproducts are then separated into components; the ash passing through the vibrating screen 122 and the other residual byproducts passing along on top of the vibrating screen 122 to another conveyor 124. The metals are then separated from the non-metals as the residual byproducts pass along endless conveyor 124. The metals are recycled. The non-metals are pulverized and used as filler in concrete.

The gases generated in the interior 21 of the rotary kiln 22 are transported to the reduction chamber 40. In the reduction chamber 40 these gases are held for at least one second while they are burned. This process may be used to generate hot water or steam which may be used to generate power.

The gases exiting the reduction chamber 40 are cooled in duct 56 with water sprayed from misting nozzles 64 while being transported to the spray dryer absorber 60. The gases are treated to remove contaminants in the spray dryer absorber 60 by exposing them to a lime and carbon water mist. Particulate generated in the spray dryer absorber 60 is passed via a conveyor 98 to an ashbin 100 where it is collected for disposal. The gases are then passed from the spray dryer absorber 60 to the baghouse 62 via duct 106. In the baghouse 62 the gases are further treated to remove any remaining contaminants. Particulate generated in the baghouse 62 is passed via an endless conveyor 112 to ashbin 100 where it is collected for disposal. The gases are then discharged to the atmosphere via a stack 114.

While we have described one preferred embodiment of the present invention, those skilled in the art will appreciate changes and modifications which may be made to the present invention without departing from the scope of the present invention. For example, the baghouse may have more or less than four chambers or more than one screen may be used to separate the solids generated in the rotary kiln. Therefore, we intend to be limited only by the scope of the following claims.

We claim:

1. A method of processing solid waste comprising:
   heating a rotary kiln;
   feeding the solid waste into the rotary kiln;
   rotating the rotary kiln, thereby generating gases and residual solids;
   removing the residual solids from the rotary kiln;
   transporting the gases from the rotary kiln to a reduction chamber;
   heating the gases in the reduction chamber;
   cooling the gases exiting the reduction chamber;
   transporting the gases to a spray dryer absorber;
   treating the gases in the spray dryer absorber to remove contaminants by introducing lime and carbon water mist in the spray dryer absorber;
   transporting the gases from the spray dryer absorber to a baghouse; and
   removing further contaminants from the gases in the baghouse.

2. The method of claim 1 wherein the step of heating the rotary kiln comprises heating the rotary kiln to at least 800 degrees Fahrenheit.

3. The method of claim 1 wherein the step of heating the gases in the reduction chamber comprises heating the reduction chamber to at least 1,800 degrees Fahrenheit.

4. The method of claim 1 further comprising separating the residual solids into components by passing the residual solids through at least one screen to separate ash from other components.

5. The method of claim 1 wherein the rotary kiln rotates at approximately one revolution per minute.

6. The method of claim 1 wherein the solid waste is rotated in the rotary kiln for six to eight hours.

7. The method of claim 1 wherein the reduction chamber is maintained at between approximately 1800–2400 degrees Fahrenheit.

8. The method of claim 1 further comprising maintaining the rotary kiln at approximately 800 degrees Fahrenheit.

9. The method of claim 1 wherein the gases are heated in the reduction chamber for at least one second.

10. The method of claim 1 further comprising collecting particulate from the spray dryer absorber and the baghouse and transporting the particulate to an ashbin.

11. The method of claim 1 wherein the gases exiting the spray dryer absorber are at a temperature of approximately 290 degrees Fahrenheit.

12. The method of claim 1 further comprising maintaining the gases exiting the rotary kiln at approximately 800 degrees Fahrenheit.

13. The method of claim 1 further comprising maintaining the gases entering the spray dryer absorber at a temperature of approximately 500 degrees Fahrenheit.

14. The method of claim 1 wherein the step of cooling the gases exiting the reduction chamber comprises spraying water into the gases.

15. The method of claim 1 wherein the step of removing further contaminants from the gases in the baghouse comprises passing the gases through filters.

16. A method of processing solid waste, said method comprising:
   feeding the solid waste into an interior of a rotary kiln at a predetermined feed rate;
   rotating the rotary kiln at a predetermined rotation speed;
   introducing air into the interior of the rotary kiln;
   heating the solid waste in the interior of the rotary kiln, thereby generating gases and residual solids;
   ducting the gases generated in the rotary kiln to a reduction chamber;
   adjusting at least one of the feed rate of the solid waste into the interior of the rotary kiln, rotation speed of the rotary kiln, and airflow into the interior of the rotary kiln to maintain the temperature of the gases exiting the rotary kiln at between 800–1200 degrees Fahrenheit;
   ducting the gases from the reduction chamber to a spray dryer absorber;

introducing lime and carbon water mist into the spray dryer absorber; and transporting the gases from the spray dryer absorber to a baghouse.

17. The method of claim 16 further comprising collecting the residual solids and separating them into components.

18. The method of claim 17 wherein separating the residual solids into components comprises passing the residual solids through at least one screen.

19. The method of claim 16 wherein the rotary kiln rotates at approximately one revolution per minute.

20. The method of claim 16 wherein the solid waste is rotated in the rotary kiln rotates for six to eight hours.

21. The method of claim 16 further comprising heating the reduction chamber to approximately 1800–2400 degrees Fahrenheit.

22. The method of claim 16 further comprising collecting particulate from the spray dryer absorber and from the baghouse.

23. The method of claim 22 further comprising passing said gases through filters in said baghouse.

24. The method of claim 16 wherein the gases exiting the spray dryer absorber are at a temperature of approximately 290 degrees Fahrenheit.

25. A system for processing solid waste, said system comprising:

a rotary kiln having drive means for rotating the rotary kiln;

a feeder for feeding said solid waste into said rotary kiln;

a heating system for heating the rotary kiln;

a reduction chamber adapted to receive and burn gases generated in the rotary kiln;

a heating system for heating the reduction chamber;

a spray dryer absorber located downstream of the reduction chamber;

a sprayer located at the top of the spray dryer absorber for spraying a lime slurry into said spray dryer absorber to remove contaminants from said gases; and a hopper adapted to receive residual solids generated in the rotary kiln.

26. The system of claim 25 further comprising a baghouse.

27. The system of claim 25 further comprising a combustion control system including a plurality of temperature probes for monitoring the temperature of said gases.

28. The system of claim 25 further comprising at least one misting nozzle to cool the gases exiting the reduction chamber.

* * * * *